(12) United States Patent
Aldereguia et al.

(10) Patent No.: US 7,294,786 B2
(45) Date of Patent: Nov. 13, 2007

(54) SYSTEM AND METHOD FOR MANAGING A CABLE IN A SERVER SYSTEM

(75) Inventors: Alfredo Aldereguia, Cary, NC (US); Grace A. Richter, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 11/101,272

(22) Filed: Apr. 6, 2005

(65) Prior Publication Data

US 2006/0228090 A1   Oct. 12, 2006

(51) Int. Cl.
*H01R 4/00* (2006.01)

(52) U.S. Cl. .................................................. 174/84 R
(58) Field of Classification Search ............... 174/36, 174/110 R, 113 R, 115, 74 R, 78, 84 R; 340/815.45, 340/817.47; 439/490
See application file for complete search history.

(56) References Cited

U.S. PATENT DOCUMENTS

| | | | |
|---|---|---|---|
| 4,074,187 A | | 2/1978 | Miller et al. |
| 4,326,162 A | | 4/1982 | Hankey |
| 4,384,249 A | | 5/1983 | Medina |
| 4,445,086 A | | 4/1984 | Bulatao |
| 4,471,293 A | | 9/1984 | Schnack |
| 4,890,102 A | * | 12/1989 | Oliver ........................ 714/712 |
| 4,978,317 A | * | 12/1990 | Pocrass ...................... 439/490 |
| 5,027,074 A | | 6/1991 | Haferstat |
| 5,081,627 A | * | 1/1992 | Yu ............................... 714/46 |
| 5,168,237 A | | 12/1992 | Fieau et al. |
| 5,198,664 A | * | 3/1993 | Fayfield ...................... 250/239 |
| 5,249,183 A | * | 9/1993 | Wong et al. ................ 370/228 |
| 5,428,671 A | | 6/1995 | Dykes et al. |
| 5,577,023 A | | 11/1996 | Marum et al. |
| 5,601,451 A | | 2/1997 | Driones et al. |
| 5,741,152 A | * | 4/1998 | Boutros ...................... 439/490 |
| 5,764,043 A | * | 6/1998 | Czosnowski et al. ......... 324/66 |
| 5,847,557 A | | 12/1998 | Fincher et al. |
| 6,099,349 A | | 8/2000 | Boutros |
| 6,102,741 A | | 8/2000 | Boutros et al. |
| 6,577,243 B1 | * | 6/2003 | Dannenmann et al. . 340/815.45 |
| 7,038,135 B1 | * | 5/2006 | Chan et al. ................ 174/84 R |

FOREIGN PATENT DOCUMENTS

WO       WO02052583 A1      7/2002

* cited by examiner

*Primary Examiner*—William H. Mayo, III
(74) *Attorney, Agent, or Firm*—Sawyer Law Group LLP

(57) ABSTRACT

A system and method for managing a cable in a server system. The system includes a first paddle card coupled to a first end of the cable and a first light emitting diode (LED) coupled to the first paddle card. The first LED turns on to facilitate a user in locating the first end of the cable. The system also includes a second paddle card coupled to a second end of the cable and a second LED coupled to the second paddle card. The second LED turns on to facilitate the user in locating the second end of the cable. As a result, the ends of the cable can be conveniently and reliably located in a server system having multiple identical cables.

2 Claims, 5 Drawing Sheets

SYSTEM AND METHOD FOR MANAGING A CABLE IN A SERVER SYSTEM

FIELD OF THE INVENTION

The present invention relates to cables, and more particularly to a system and method for managing a cable in a server system.

BACKGROUND OF THE INVENTION

Cables are well known and are used to connect multiple components such as server nodes in a server system. The cables are often identical, and the number of cables can vary. For example, in some server systems, there may be as few as 3 identical cables or as many as 12 identical cables, depending on the server system configuration.

FIG. 1 is a block diagram of a 16-way server system 50. The 16-way server system 50 includes two 8-way server nodes 52 and 54, four scalability cables 56, 58, 60, and 62, and two shorter cables 64 and 66. In the case of server system 50, each scalability cable 56-62 is longer than two meters, and all of the scalability cables 56-62 are identical. Also, the short cables 64 and 66 are identical to one another and look like the scalability cables 56-62.

FIG. 2 is a block diagram of a 32-way server system 70. The 32-way server system 70 includes four 8-way server nodes 72, 74, 76, and 78, eight scalability cables 81, 82, 83, 84, 85, 86, 87, and 88, and four short cables 90, 92, 94, and 96. Similar to the scalability cables 56-62 of FIG. 1, the scalability cables 81-88 of FIG. 2 are identical and look like the short cables 90-96.

As can be seen in FIGS. 1 and 2, cabling can become very confusing and difficult to manage during setup and configuration of a server system since, the cables look the same. The problem is compounded with more cables. In order for a server system to function fully, all cabling must be complete.

The conventional method for locating cable connections is to trace each cable by hand from point to point, which can be tedious and error prone. For example, if a cable needs replacing as may be indicated by a service processor, the user is required to locate the indicated port via a small label. After locating one end of the cable, the other end needs to be located typically by tracing the cable by hand. This can be troublesome especially if the cables are difficult to access (e.g. out of reach or in a rack). Furthermore, the cable may be in a bundle of cables that are tie wrapped or beneath a raised floor.

Accordingly, what is needed is a more efficient system and method for managing a cable in a server system. The system and method should be simple, cost effective, and capable of being easily adapted to existing technology. The present invention addresses such a need.

SUMMARY OF THE INVENTION

A system and method for managing a cable in a server system are disclosed. The system includes a first paddle card coupled to a first end of the cable and a first light emitting diode (LED) coupled to the first paddle card. The first LED turns on to facilitate a user in locating the first end of the cable. The system also includes a second paddle card coupled to a second end of the cable and a second LED coupled to the second paddle card. The second LED turns to facilitate the user in locating the second end of the cable. As a result, the ends of the cable can be conveniently and reliably located in a server system having multiple identical cables.

DETAILED DESCRIPTION OF THE INVENTION

The present invention relates to cables, and more particularly to a system and method for managing a cable in a server system. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

A system and method in accordance with the present invention for managing a cable in a server system are disclosed. The system includes paddle cards that are coupled to each end of the cable. Each paddle card is coupled to a light emitting diode (LED) that lights up so that the ends of the cable can be visually located among a multitude of cables. In another embodiment of the present invention, the LEDs coupled to each paddle card light up when both ends of the cable have been connected so that it can be easily and visually determined if both ends of the cable are connected. As a result, a cable can be conveniently and reliably located and the cable connections can be easily verified in a server system having multiple identical cables. To more particularly describe the features of the present invention, refer now to the following description in conjunction with the accompanying figures.

Although the present invention disclosed herein is described in the context of server systems, the present invention may apply to other types of systems, and still remain within the spirit and scope of the present invention.

Figure 1:
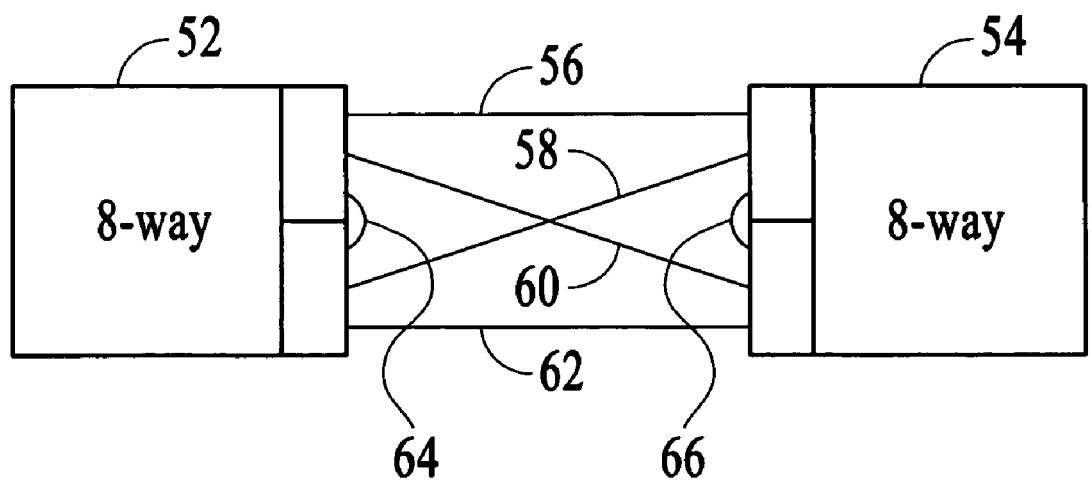
FIG. 1 is a block diagram of a conventional 16-way server system.
Figure 2:
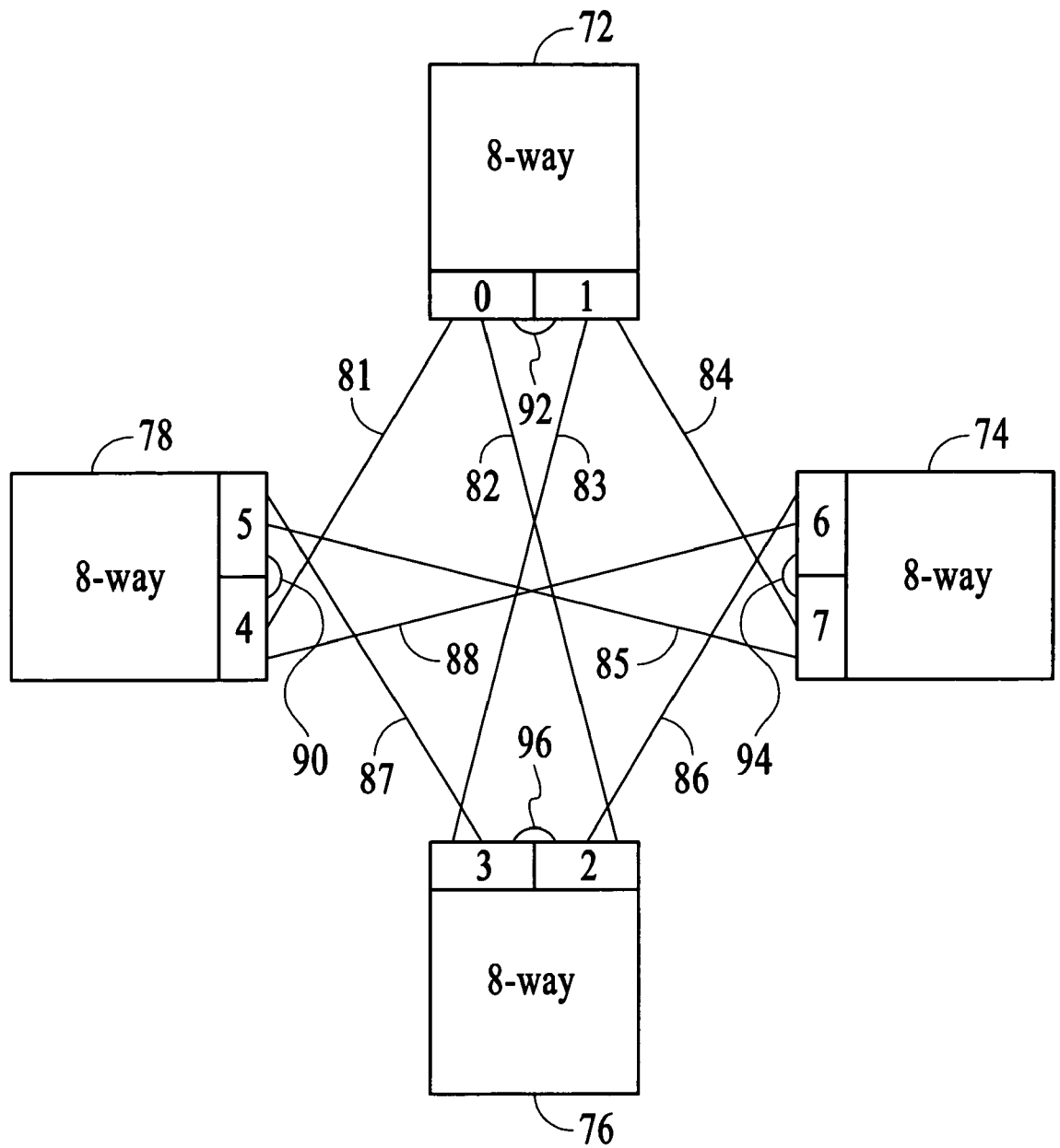
FIG. 2 is a block diagram of a conventional 32-way server system.
Figure 3:
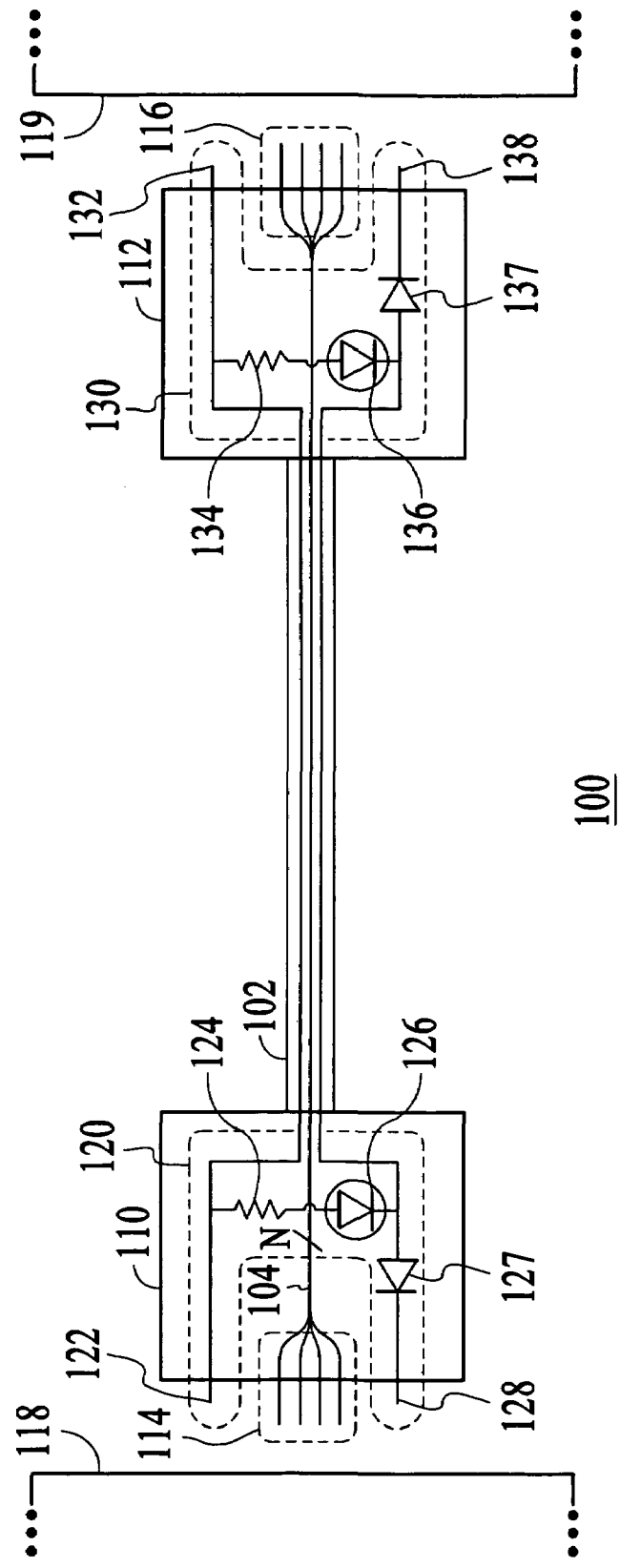
FIG. 3 is a block diagram of a cable system in accordance with the present invention.

FIG. 3 is a block diagram of a cable system 100 in accordance with the present invention. The cable system 100 includes a cable 102, a paddle card 110 coupled to one end of the cable 102, and a paddle card 112 coupled to the other end of the cable 102. The cable 102 includes a flexible wire or bundle of N wires 104. One or more connection pins 114 are coupled to one end of the wires 104, and one or more connection pins 116 are coupled to the other end of the wires 104. As such, the connection pins 114 and 116 to connect the cable (i.e. the wires 104) to server system nodes 118 and 119 when the paddle cards 110 and 112 are plugged into the server system nodes 118 and 119.

According the present invention, an LED circuit 120 is coupled to the paddle card 110. The LED circuit 120 includes a voltage pin 122, a resister 124, an LED 126, a diode 127, and a ground pin 128. Similarly, an LED circuit 130 is coupled to the paddle card 112. The LED circuit 130 includes a voltage pin 132, a resistor 134, an LED 136, a diode 137, and a ground pin 138. In a specific embodiment, the voltage at the voltage pins 122 and 132 is 3.3V. However, the voltage at the voltage pins 122 and 132 may vary and the specific voltage will depend on the specific application.

Figure 4:
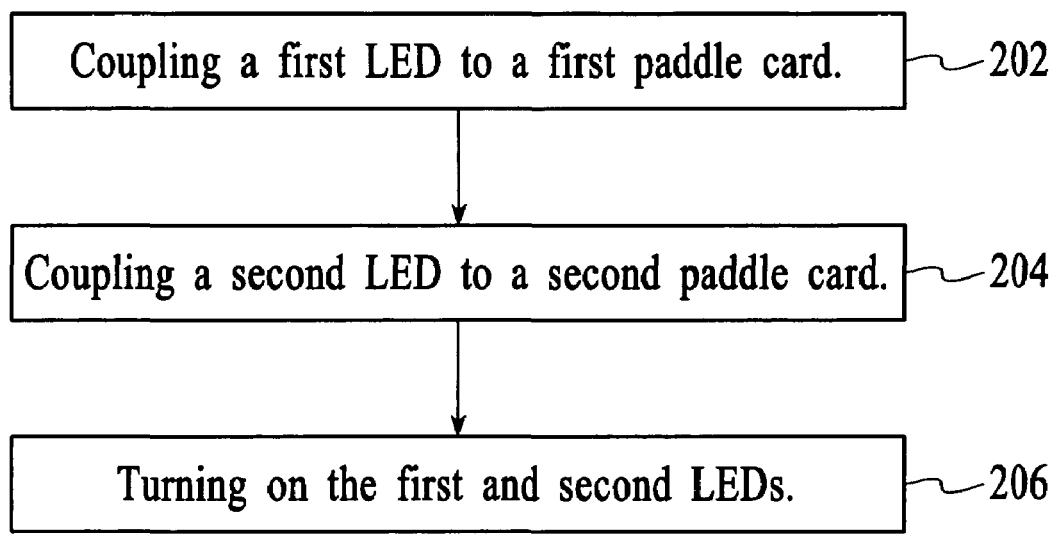
FIG. 4 is a flow chart showing a method for managing a cable in accordance with the present invention.

FIG. 4 is a flow chart showing a method for managing a cable in accordance with the present invention. Referring to both FIGS. 3 and 4 together, the first LED 126 is coupled to the paddle card 110, in a step 202. Next, the second LED 136 is coupled to the second paddle card 112, in a step 204. Next, the first and second LEDs 126 and 136 are turned on, in a step 206. The LEDs being lit up (i.e. in an "on" state) facilitate a user in locating the ends of the cable 102. In addition, as is described further below in FIG. 5, the LED's being lit up can also indicate to the user that both ends of the cable 102 are connected to their respective server system nodes 118 and 119.

In accordance with the present invention, the LEDs 126 and 136 are connected across the cable 102 such that both LEDs 126 and 136 can be turned on even if one end of the cable 102 (i.e. one of the paddle cards 110 or 112) is not plugged in to the server system. For example, if the paddle card 110 is plugged into the server system and the paddle card 112 is not, both of the LEDs 124 and 134 will still turn on. The LEDs could be turned on via a service processor. The circuit could be connected to an inter integrated circuit (12C) device on the server, which would allow the service processor to turn the LEDs on and off. I2C devices, which are well known, adhere to an I2C protocol. I2C devices operate with an I2C bus, which is an inter IC serial 2 wire bus that provides the communications link between some integrated circuits in a system. Alternatively, the LEDs could be turned on as soon as the cable is connected to the server. In this case the LED circuit would be connected directly to Vcc and Ground on the system board.

Figure 5:
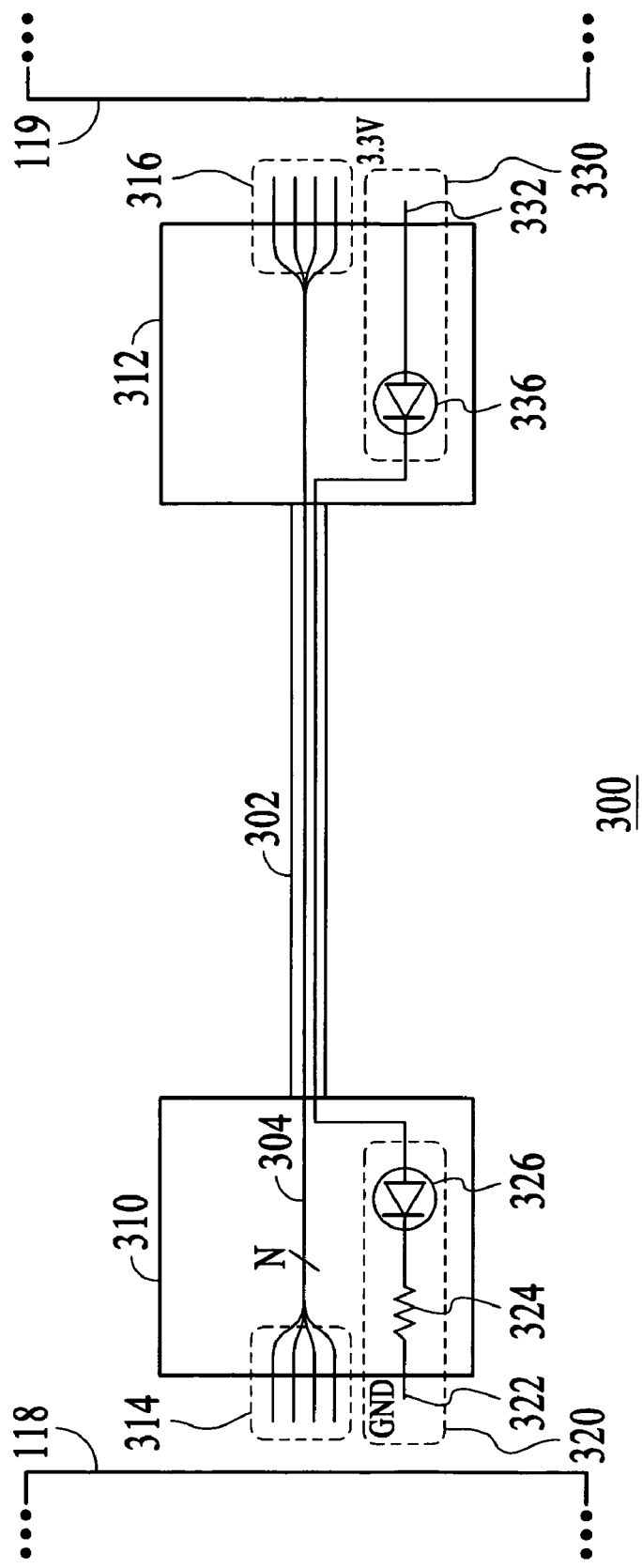
FIG. 5 is a block diagram of a cable system in accordance with another embodiment of the present invention.

FIG. 5 is a block diagram of a cable system 300 in accordance with another embodiment of the present invention. The cable system 300 includes a cable 302, a paddle card 310 coupled to one end of the cable 302, and a paddle card 312 coupled to the other end of the cable 302. The cable 302 includes a flexible wire or bundle of N wires 304. One or more connection pins 314 are coupled to one end of the wires 304, and one or more connection pins 316 are coupled to the other end of the wires 304. As such, the connection pins 314 and 316 to connect the cable (i.e. the wires 304) to server system nodes 118 and 119 when the paddle cards 310 and 312 are plugged into the server system nodes 118 and 119.

According the present invention, an LED circuit 320 is coupled to the paddle card 310. The LED circuit 320 includes a ground pin 322, a resister 324, and an LED 326. An LED circuit 330 is coupled to the paddle card 312. The LED circuit 330 includes a voltage pin 332 and an LED 136. As shown in FIG. 5, the LED circuits 320 and 330 are integrated such that the LEDs 326 and 336 turn on when both of the paddle cards 310 and 312 are plugged into the server system nodes 118 and 119. In a specific embodiment, the voltage at the voltage pin 332 is 3.3V. However, the voltage at the voltage pin 332 may vary and the specific voltage will depend on the specific application.

In operation, the LEDs coupled to each paddle card light up when both ends of the cable have been connected so that it can be easily and visually determined if both ends of the cable are connected.

According to the system and method disclosed herein, the present invention provides numerous benefits. For example, it visually identifies a cable in an environment where multiple cables of the same type are used and allows the user to determine if a cable is connected at both ends. As a result, configuration and serviceability of a server system is improved due to the ease of determining where cables are connected, particularly in server systems with multiple identical cables.

A system and method in accordance with the present invention for locating a cable in a server system has been disclosed. The system includes paddle cards that are coupled to each end of the cable. Each paddle card is coupled to an LED that lights up so that the ends of the cable can be visually located among a multitude of cables. In another embodiment of the present invention, the LEDs coupled to each paddle card light up when both ends of the cable have been connected so that it can be easily and visually determined if both ends of the cable are connected. As a result, a cable can be conveniently and reliably located and the cable connections can be easily verified in a server system having multiple identical cables.

The present invention has been described in accordance with the embodiments shown. One of ordinary skill in the art will readily recognize that there could be variations to the embodiments, and that any variations would be within the spirit and scope of the present invention. For example, although the paddle cards 110 and 112 shown in FIG. 3 are coupled to male connectors, one of ordinary skill in the art will readily realize that the paddle cards 110 and 112 may also be configured to couple to female connectors and still remain within the spirit and scope of the present invention. Accordingly, many modifications may be made by one of ordinary skill in the art without departing from the spirit and scope of the appended claims.

What is claimed is:

1. A system comprising:
a first paddle card coupled to a first end of a cable;
a first light emitting diode (LED) coupled to the first paddle card, wherein the first LED turns on to facilitate a user in locating the first end of the cable, wherein the first paddle card is plugged into a first node of a first server system, wherein the first LED couples to a first voltage pin that couples directly to Vcc of the first server system, and wherein the first voltage pin does not couple to a ground of the first server system;
a second paddle card coupled to a second end of the cable; and
a second LED coupled to the second paddle card, wherein the first LED is coupled to the second LED, wherein the second LED turns on to facilitate the user in locating the second end of the cable, wherein the second paddle card is plugged into a second node of a second server system, wherein the second LED couples to a resistor that couples to a second voltage pin that couples directly to a ground of the second server system, wherein the second voltage pin does not couple to Vcc of the second server system, and wherein the first LED and the second LEDs turn on when both of the first and second paddle cards are plugged into the respective first and second server systems.

2. A method for managing a cable, the method comprising:
coupling a first light emitting diode (LED) to a first paddle card;
coupling a second LED to a second paddle card, wherein the first LED is coupled to the second LED;
turning on the first and second LEDs, wherein the LEDs facilitate a user in locating the ends of the cable, wherein the first paddle card is plugged into a first node of a first server system, wherein the first LED couples to a first voltage pin that couples directly to Vcc of the first server system, wherein the first voltage pin does not couple to a ground of the first server system, wherein the second paddle card is plugged into a second node of a second server system, wherein the second LED couples to a resistor that couples to a second voltage pin that couples directly to a ground of the second server system, wherein the second voltage pin does not couple to Vcc of the second server system, and wherein the first LED and the second LEDs turn on when both of the first and second paddle cards are plugged into the respective first and second server systems.

* * * * *